(12) United States Patent
Zhou et al.

(10) Patent No.: US 11,608,416 B2
(45) Date of Patent: Mar. 21, 2023

(54) METHOD FOR SYNTHESIZING ALIPHATIC POLYESTER BLOCK COPOLYMER REGULATED BY CARBON MONOXIDE

(71) Applicant: HUAZHONG UNIVERSITY OF SCIENCE AND TECHNOLOGY, Hubei (CN)

(72) Inventors: Xingping Zhou, Hubei (CN); Yajun Zhao, Hubei (CN); Yong Wang, Hubei (CN); Xiaolin Xie, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/639,592

(22) PCT Filed: Jan. 13, 2020

(86) PCT No.: PCT/CN2020/071651
§ 371 (c)(1),
(2) Date: Apr. 6, 2022

(87) PCT Pub. No.: WO2021/042658
PCT Pub. Date: Mar. 11, 2021

(65) Prior Publication Data
US 2022/0332901 A1  Oct. 20, 2022

(30) Foreign Application Priority Data

Sep. 2, 2019  (CN) .................. 201910823296.X

(51) Int. Cl.
| | | |
|---|---|---|
| *C08F 220/14* | (2006.01) | |
| *C08F 293/00* | (2006.01) | |
| *C08G 81/02* | (2006.01) | |
| *C08G 63/06* | (2006.01) | |
| *C08G 63/66* | (2006.01) | |
| *C08G 63/82* | (2006.01) | |

(52) U.S. Cl.
CPC .......... *C08G 81/027* (2013.01); *C08F 220/14* (2013.01); *C08G 63/065* (2013.01); *C08G 63/66* (2013.01); *C08G 63/82* (2013.01)

(58) Field of Classification Search
CPC .... C08G 81/02; C08G 81/024; C08G 81/027; C08G 63/065; C08G 2261/126; C08G 64/18; C08F 293/00; C08F 293/05; C08F 299/04; C08F 299/0421; C08F 299/0428; C08F 299/0435
See application file for complete search history.

(56) References Cited

FOREIGN PATENT DOCUMENTS

| | | | |
|---|---|---|---|
| CN | 103865047 | 6/2014 | |
| CN | 107446122 | 12/2017 | |
| CN | 107686552 | 2/2018 | |
| CN | 108752575 | 11/2018 | |
| CN | 110511336 | 11/2019 | |
| EP | 2439185 | 4/2012 | |
| EP | 3034546 A1 * | 6/2016 | ............. C08F 2/38 |
| EP | 3034547 A1 * | 6/2016 | ............. C08F 2/38 |
| WO | WO-2009025850 A2 * | 2/2009 | ............. C08G 63/42 |
| WO | 2018142384 | 8/2018 | |

OTHER PUBLICATIONS

"International Search Report (Form PCT/ISA/210) of PCT/CN2020/071651," dated May 28, 2020, with English translation thereof, pp. 1-6.
"Written Opinion of the International Searching Authority (Form PCT/ISA/237) of PCT/CN2020/071651," dated May 28, 2020, pp. 1-5.
Yong Wang et al., "Switchable Polymerization Triggered by Fast and Quantitative Insertion of Carbon Monoxide into Cobalt-Oxygen Bonds", Angew. Chem. Int. Ed., vol. 59, Feb. 2020, pp. 5988-5994.
Yajun Zhao et al., "Cobalt-Mediated Switchable Catalysis for the One-Pot Synthesis of Cyclic Polymers", Angew. Chem. Int. Ed., vol. 60, May 2021, pp. 16974-16979.
Yong Wang et al., "AOne-Step Route to CO2-Based Block Copolymers by Simultaneous ROCOP of CO2/Epoxides and RAFT Polymerization of Vinyl Monomers", Angew. Chem. Int. Ed., vol. 57, Feb. 2018, pp. 3593-3597.
Yusheng Chen et al., "Ring-Opening Copolymerization of Maleic Anhydride with Functional Epoxides: Poly (propylene fumarate) Analogues Capable of Post-Polymerization Modification", Angew. Chem. Int. Ed., vol. 57, Issue 2, Aug. 2018, pp. 12759-12764.
Yajun Zhao et al., "Oxygen-Triggered Switchable Polymerization for the One-Pot Synthesis of CO2-Based Block Copolymers from Monomer Mixtures", Angew. Chem. Int. Ed., vol. 58, Jul. 2019, pp. 14311-14318.
Erin M. Broderick et al., "Redox Control of a Ring-Opening Polymerization Catalyst", J. Am. Chem. Soc., vol. 133, May 2011, pp. 9278-9281.
Tim Stößer et al., "Easy access to oxygenated block polymers via switchable catalysis", Nature Communications, vol. 10, Issue 1, Jun. 2019, pp. 1-9.

* cited by examiner

*Primary Examiner* — Irina S Zemel
*Assistant Examiner* — Jeffrey S Lenihan
(74) *Attorney, Agent, or Firm* — JCIPRNET

(57) ABSTRACT

A method for synthesizing an aliphatic polyester block copolymer regulated by carbon monoxide. The method uses an organic cobalt metal complex as a convertible catalyst and includes: first regulating an anionic ring-opening copolymerization reaction between an aliphatic acid anhydride and an epoxy compound; then using carbon monoxide as a conversion agent for conversion to obtain a catalyst having a new catalytic active site; and regulating a vinyl monomer to perform active free radical polymerization to obtain an aliphatic polyester block copolymer having a controllable structure. The described synthesis method uses a convertible catalyst and a conversion agent, combines two controllable polymerization reactions which have different but compatible mechanisms, and obtains a block copolymer by means of a "one-pot" reaction.

11 Claims, 5 Drawing Sheets

METHOD FOR SYNTHESIZING ALIPHATIC POLYESTER BLOCK COPOLYMER REGULATED BY CARBON MONOXIDE

CROSS-REFERENCE TO RELATED APPLICATION

This is a 371 application of the International PCT application serial no. PCT/CN2020/071651, filed on Jan. 13, 2020, which claims the priority benefits of China Application No. 201910823296.X, filed on Sep. 2, 2019. The entirety of each of the above-mentioned patent applications is hereby incorporated by reference herein and made a part of this specification.

BACKGROUND

Field of the Disclosure

The disclosure belongs to the technical field of polymer synthesis, and in particular relates to a method for synthesizing an aliphatic polyester block copolymer regulated by carbon monoxide.

Description of Related Art

In the nature, the regulation of biological enzymes enables the complex metabolic catalysis and feedback mechanisms in the human body to be effectively controlled, ensuring that human beings can perform activities in a highly orderly manner. In the field of polymer catalysis, there is still great challenge for research aiming to obtain block polymers with precise and controllable sequences in a mixed system of various monomers. At present, the synthesis of block copolymers is mainly achieved step by step through stepwise addition method, macromolecular initiation method, and so forth.

The stepwise addition method utilizes a catalytic system and a polymerization mechanism to gradually react different monomers to obtain a block copolymer in a sequential manner. However, when the previous monomer is not completely reacted, the node structure between the two blocks will become a polymer chain, which makes it difficult to control the microstructure of the block polymer. In the meantime, the selectivity and controllability of a catalytic system to different monomers are significantly different, so it is difficult to achieve a good match between the catalytic system and the monomers. The macromolecular initiation method first requires the synthesis of macromolecular initiator precursors, and then initiates the subsequent polymerization reaction to obtain the target block copolymer. The key to this method lies in the separation and purification process of the macromolecular initiator precursors and the post-modification of protection/deprotection process. It is difficult to ensure the initiation efficiency of the precursor, resulting in the presence of some homopolymers in the final product. Furthermore, the polymerization reaction is normally very sensitive to water and oxygen, and unpredictable side reactions are prone to occur in the tedious operation process, which affects the controllability of block copolymer, and limits the application ranges of block copolymers.

Compared with conventional synthesis strategies, the convertible catalysts based on biomimetic design principles exhibit different catalytic activities under different stimuli, and exhibit excellent selectivity and controllability in monomer-mixed systems. Generally, the main method to modulate catalytic activity is to add stimuli-responsive functional groups to ligands or to directly change the oxidation state of the central metal. Diaconescu's research group used redox agents to change the valence state of metal Fe, and realized the convertible catalytic polymerization of epoxy compounds and lactone monomers (J. Am. Chem. Soc., 2011, 24, 9278), which essentially utilized metal alkoxy activity centers to realize anionic ring-opening of different cyclic compounds. In the meantime, Williams' research group used organic chromium complexes as convertible catalysts, and used the different activities of different polymerized monomers to adjust the copolymerization reaction of epoxy compounds and cyclic acid anhydrides in series, thereby forming the first block polyester. After the reaction of the cyclic acid anhydride is completed, the intermediate continues to initiate ring-opening of the epoxy compound monomer to form the second polyether, and an aliphatic polyester block copolymer with a controllable structure is obtained (Nat. Commun., 2019, 1, 2668). Currently, convertible polymerization systems are limited to conversion between polymerizations with similar reaction mechanisms, which limits the selection range of polymerized monomers and the diversity of block copolymer structures to a certain extent. Therefore, on the one hand, the drawbacks of conventional synthesis methods need to be avoided, and on the other hand, single-metal catalysts are used as convertible catalysts to realize polymerization reactions with completely different polymerization mechanisms. Using the "one-pot" method to synthesize aliphatic polyester block copolymer with controllable structure is an urgent issue which needs to be addressed.

SUMMARY OF THE DISCLOSURE

The purpose of the present disclosure is to provide a method for synthesizing aliphatic polyester block copolymers regulated by carbon monoxide to solve the problems existing in the conventional technology, using an organic cobalt metal complex as a convertible catalyst and carbon monoxide as a conversion agent, avoiding the shortcomings of conventional methods such as cumbersome operation steps and difficulty in separation of products. The method of the present disclosure may adopt a one-pot method to prepare aliphatic polyester block copolymers containing different polymerization mechanisms, thus broadening the selection range of monomers.

For achieving the above purpose, the technical scheme adopted in the present disclosure is:

A method for synthesizing an aliphatic polyester block copolymer regulated by carbon monoxide uses an organic cobalt metal complex as a convertible catalyst, uses an aliphatic acid anhydride, an epoxy compound monomer and a vinyl monomer as reaction raw materials, and uses carbon monoxide as a conversion agent. The "one-pot method" is adopted to synthesize aliphatic polyester block copolymer, which includes the following steps:

The organic cobalt metal complex regulates the epoxy compound monomer and the aliphatic acid anhydride to carry out anionic ring-opening copolymerization reaction, and then the carbon monoxide is filled in to obtain a new catalytic active site. Thereafter, a vinyl monomer is regulated under an illumination condition to carry out an active free-radical polymerization. Finally, separation, purification and drying are performed to obtain an aliphatic polyester block copolymer.

When the preparation method is performed, firstly, the anionic ring-opening copolymerization of epoxy compound and aliphatic acid anhydride is realized through the reversible hetero-cleavage of cobalt-oxygen bond. Then the cobalt-carbon bond at the catalytic site of free radical polymerization is formed through carbon monoxide insertion reaction. The reversible hemolytic-cleavage of the cobalt-carbon bond is utilized to establish the dynamic equilibrium of Co(III) and Co(II). Under the irradiation of white light, the free radical controllable polymerization of vinyl monomers is realized, and the target block copolymer is finally obtained.

Moreover, the method specifically includes the following steps:

S1: Under an atmosphere of protective gas, the epoxy compound monomer, vinyl monomer, aliphatic acid anhydride and organic cobalt metal complex catalyst are uniformly mixed in a reaction vessel to form a pre-reaction mixed solution. Specifically, the molar ratio of the epoxy compound:aliphatic acid anhydride:vinyl monomer:catalyst is (250-20000):(50-1000):(50-1000):1.

S2: The reaction vessel described in step S1 is sealed and placed under a predetermined reaction temperature. An anionic ring-opening copolymerization reaction between the epoxy compound monomer and the aliphatic acid anhydride described in step S1 is performed.

S3: After the reaction in step S2 is carried out for a certain period of time, the inert gas in the reaction vessel described in step S2 is replaced with carbon monoxide at a predetermined pressure, and the reaction vessel is placed under a predetermined reaction temperature, that is, the carbon monoxide insertion reaction is performed to form a new catalytic active site through free radical polymerization.

S4: After the reaction in step S3 is carried out for a certain period of time, the carbon monoxide in the reaction vessel of step S3 is replaced with an inert gas, and the reaction vessel is placed under a predetermined reaction temperature. Under the irradiation of white light, the active free-radical polymerization of the vinyl monomer is initiated.

S5: After the reaction in step S4 is carried out for a certain period of time, the white light is turned off or a polymerization inhibitor is added to terminate the active free-radical polymerization in step S4. The catalyst and unreacted monomers are removed from the prepared crude product, then purification and drying are performed to obtain the target block copolymer.

The addition amount of polymerization inhibitor is the conventional addition amount in the conventional technology, for example, the molar ratio of polymerization inhibitor:catalyst is (5-10):1.

The molecular weight distribution index of the block copolymer prepared through steps S1 to S5 is 1.05 to 1.22.

Moreover, the molar ratio of the epoxy compound:aliphatic acid anhydride:vinyl monomer:catalyst is (500-10000):(100-500):(100-800):1.

Further, the epoxy compound monomer has the following structure:

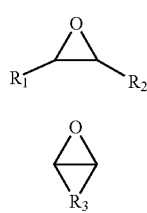

In the formula, in structure I, groups $R_1$ and $R_2$ are respectively selected from one of H, a C1-C20 alkyl group containing a substituent group or a C6-C20 aryl group containing a substituent group A1. In structure II, group $R_3$ is selected from one of C1-C20 alkyl group, C6-C20 aryl group, C1-C20 alkyl group containing a substituent group A1 and C6-C20 aryl group containing a substituent group A1. The substituent group A1 is one of halogen, nitro or cyano.

The vinyl monomer is at least one of acrylate, acrylonitrile, N-alkylpyrrolidone, N,N-dialkylacrylamide and N-acryloylmorpholine.

Further, the organic cobalt metal complex is a cobalt-based double-Schiff base complex, and the cobalt-based double-Schiff base complex has one of the III-V structural formulas:

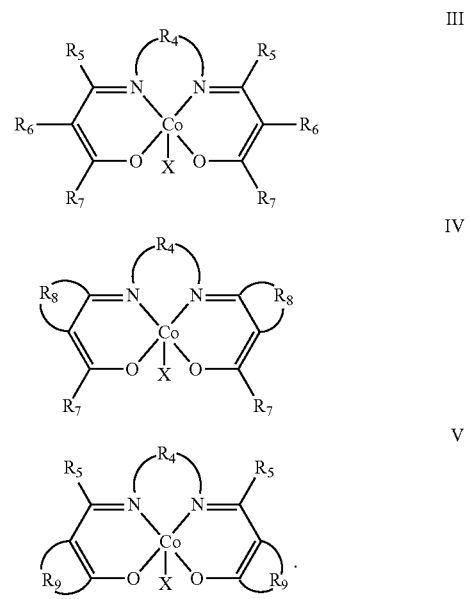

In the formula, in the structural formula III-V, the group $R_4$ is an alkyl chain containing a substituted group A2, and the alkyl chain is one of a C1-C20 alkyl group or a C1-C20 alkoxy group, and the substituent group A2 is halogen, nitro, amino or cyano.

In the structural formula III-V, the groups $R_5$, $R_6$ and $R_7$ are respectively selected from one of H, a C1-C20 alkyl group, a C1-C20 alkoxy group and a C1-C20 fluorine-substituted alkyl group; $R_8$ and $R_9$ are respectively one of a C1-C20 alkyl group, a C6-C20 aryl group, a C1-C20 alkyl group containing a substituent group A1 and a C6-C20 aryl group containing a substituent group.

In the structural formula III-V, group X is one of halogen, $-NO_3$, $CH_3COO-$, $CF_3COO-$, $ClO_4-$, $BF_4-$, $BPh_4-$, $-CN$, $-N_3$, p-toluic acid radical, p-toluenesulfonic acid radical, o-nitrophenol oxygen, p-nitrophenol oxygen, m-nitrophenol oxygen, 2,4-dinitrophenol oxygen, 3,5-dinitrophenol oxygen, 2,4,6-trinitrophenol oxygen, 3,5-dichlorophenolic oxygen, 3,5-difluorophenolic oxygen, 3,5-ditrifluoromethylphenolic oxygen or pentafluorophenolic oxygen anion.

Moreover, the mixing time of the pre-reaction mixed solution described in step S1 is 5 to 30 minutes; and the protective gas is nitrogen or an inert gas.

Further, the predetermined reaction temperature in step S2 is 0 to 60° C.

Further, the predetermined pressure in step S3 is 0.1 to 5.0 MPa; the predetermined reaction temperature in step S3 is 0 to 60° C.

Further, the predetermined reaction temperature in step S4 is 0 to 60° C.; the light intensity of the white light in step S4 is 1 to 10 mW/cm$^{-2}$; the wavelength range of the white light is 390 to 780 nm.

Furthermore, the polymerization inhibitor in step S5 is at least one of benzoquinone, nitro compound, aromatic amine, phenol, 1,1-diphenyl-2-trinitrophenylhydrazine, and triphenylmethyl.

Compared with the conventional technology, the advantageous effects of the present disclosure are:

(1) The disclosure uses an organic cobalt metal complex as a convertible catalyst and uses a carbon monoxide as a conversion agent, combines two controllable polymerization reactions which have different but compatible mechanisms, and obtains a block copolymer by means of a "one-pot" reaction. The disclosure may effectively avoid the separation and purification of intermediates, reduce tedious experimental procedures and costs for protection/deprotection; the selection range of monomer types is broadened, and the diversity of block copolymer structures is enriched. The specific mechanism is as follows:

First, the anionic ring-opening copolymerization of epoxy compound and aliphatic acid anhydride is realized through reversible hetero-cleavage of cobalt-oxygen bonds. Then, the formation of cobalt-carbon bonds at the catalytic site of free radical polymerization is realized by means of carbon monoxide insertion reaction. The reversible hemolytic-cleavage of the cobalt-carbon bond is utilized to establish the dynamic equilibrium of Co(III) and Co(II), and under the irradiation of white light, the free radical controllable polymerization of vinyl monomers is realized, and the target block copolymer is finally obtained. The synthesis method is as follows: shown in FIG. 5.

anionic ring-opening copolymerization reaction regulated by carbon monoxide active free-radical polymer (2) The present disclosure provides a convertible catalytic system. Catalytic active centers with different structures catalyze different types of polymerization reactions, so as to achieve precise regulation of the microscopic chain structure of polymer. In the meantime, conditions such as catalyst/monomer feeding ratio and reaction time are changed to control polymerization reaction to prepare a specific block copolymer. The polymerization method of the present disclosure helps to establish the relationship model between the microstructure and the performance of the polymer material, and provides possibilities for directional improvement of material performance.

DESCRIPTION OF EMBODIMENTS

The technical solutions of the present disclosure will be clearly and thoroughly described below with reference to the accompanying drawings of the present disclosure. Clearly, the described embodiments are only a part of the embodiments of the present disclosure, not all of the embodiments. Based on the embodiments of the present disclosure, all other embodiments obtained by persons of ordinary skill in the art without creative efforts shall fall within the scope to be protected by the present disclosure.

In order to make the test results consistent, the wavelength used in the experimental conditions of all the embodiments and comparative examples of the present disclosure is 460 nm.

Embodiment 1

S1: 3 mL of propylene oxide, 9 mL of methyl acrylate, 2.96 g of phthalic anhydride and 3.2 mg of N,N-bis(3,5-di-tert-butylsalicylidene-1,2-cyclohexanediamine) cobalt chloride complex (epoxy compound:aliphatic acid anhydride:vinyl monomer:catalyst=250:50:50:1) were taken from a glove box. After magnetic stirring was performed for 20 minutes, a pre-reaction mixed solution was obtained.

S2: The system was kept sealed, and the temperature of the reaction eggplant flask was controlled at 30° C., that is, the anionic ring-opening copolymerization reaction of the epoxy compound and the aliphatic acid anhydride was initiated.

S3: Reaction was carried out for 35 hours. The anionic ring-opening copolymerization system was filled with 1.0 MPa of carbon monoxide, and the temperature of the reaction eggplant flask was controlled at 30° C. The insertion reaction of the carbon monoxide was initiated, and the active catalytic site of the active free-radical polymerization was formed.

S4: The reaction was carried out for 9 hours. The carbon monoxide in the reaction vessel was released, and the reaction temperature was controlled at 20° C. The active free-radical polymerization of the vinyl monomer was initiated under the irradiation of a white light with a light intensity of 10 mW/cm$^{-2}$.

S5: The reaction was carried out for 0.5 hours. The irradiation of light was turned off to complete the active free-radical polymerization, the catalyst and unreacted raw materials were removed, and an aliphatic polyester block copolymer with a molecular weight distribution index of 1.16 was obtained.

Figure 1:
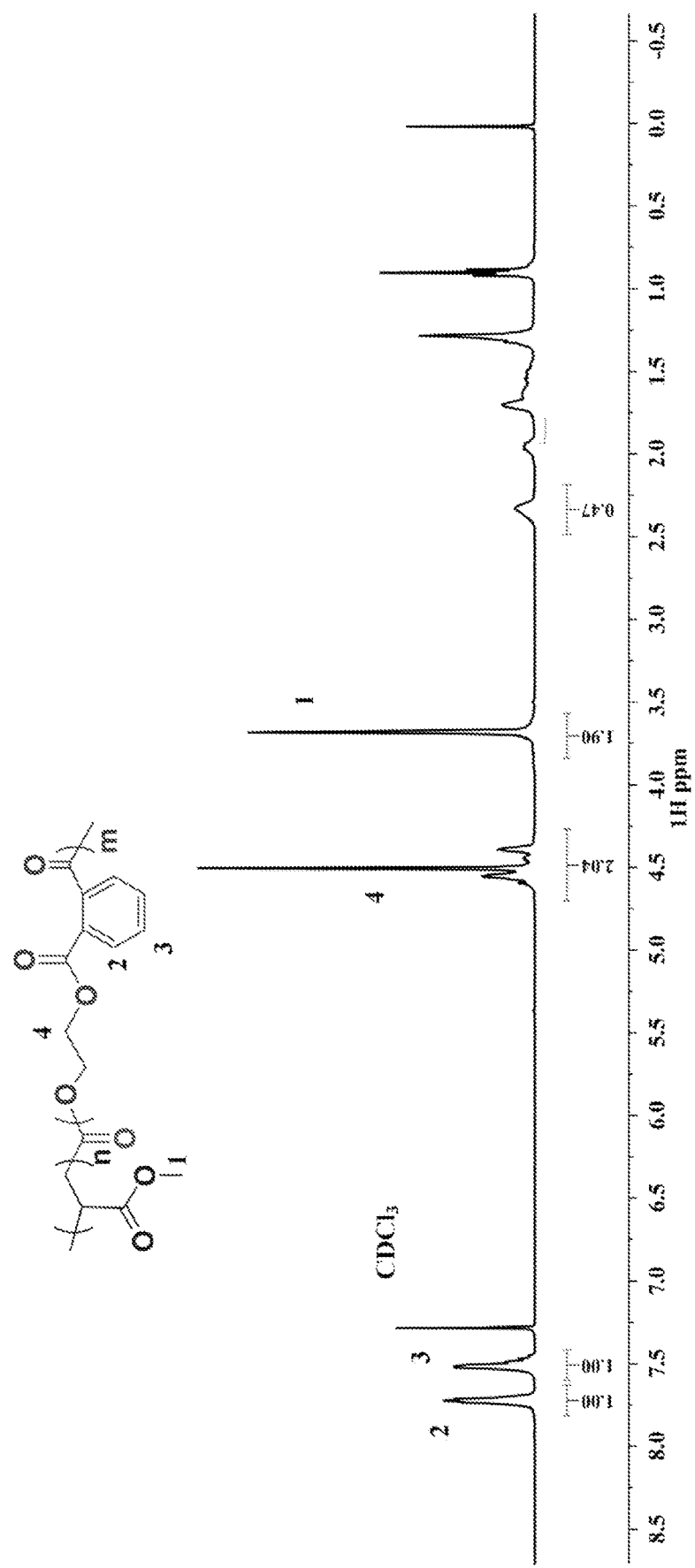
FIG. 1 is a hydrogen nuclear magnetic resonance spectrogram (1H NMR, CDCl$_3$) of an aliphatic polyester block copolymer in the Embodiment 1.

The hydrogen nuclear magnetic resonance spectrogram (1H NMR, CDCl$_3$) of the prepared aliphatic polyester block copolymer is shown in FIG. 1. It can be clearly seen from the diagram that each functional group in the block copolymer corresponds to the hydrogen spectrogram one by one. It is shown that the aliphatic polyester block copolymer was successfully prepared by the preparation method of the Embodiment 1.

Embodiment 2

S1: 20 mL of ethylene oxide, 11.25 mL of methyl acrylate, 0.74 g of phthalic anhydride and 29.5 mg of N,N-bis(3,5-di-tert-butylsalicylidene-1,2-ethylenediamine) cobalt chloride complex (epoxy compound:aliphatic acid anhydride:vinyl monomer:catalyst=20000:1000:1000:1) were taken from an anhydrous and oxygen-isolated glove box and added to the reaction eggplant flask. After magnetic stirring was performed for 10 minutes, a pre-reaction mixed solution was obtained.

S2: The system was kept sealed, and the temperature of the reaction eggplant flask was controlled at 30° C., that is, the anionic ring-opening copolymerization reaction of the epoxy compound and the aliphatic acid anhydride was initiated.

S3: Reaction was carried out for 48 hours. The anionic ring-opening copolymerization system was filled with 1.0 MPa of carbon monoxide, and the temperature of the reaction eggplant flask was controlled at 30° C. The insertion reaction of the carbon monoxide was initiated, and the active catalytic site of the active free-radical polymerization was formed.

S4: The reaction was carried out for 12 hours. The carbon monoxide in the reaction vessel was released, and the reaction temperature was controlled at 20° C. The active free-radical polymerization of the vinyl monomer was initiated under the irradiation of a white light with a light intensity of 5 mW/cm$^{-2}$.

S5: The reaction was carried out for 1 hour. The irradiation of light was turned off to complete the active free-radical polymerization, the catalyst and unreacted raw materials were removed, and an aliphatic polyester block copolymer with a molecular weight distribution index of 1.15 was obtained.

Figure 3:
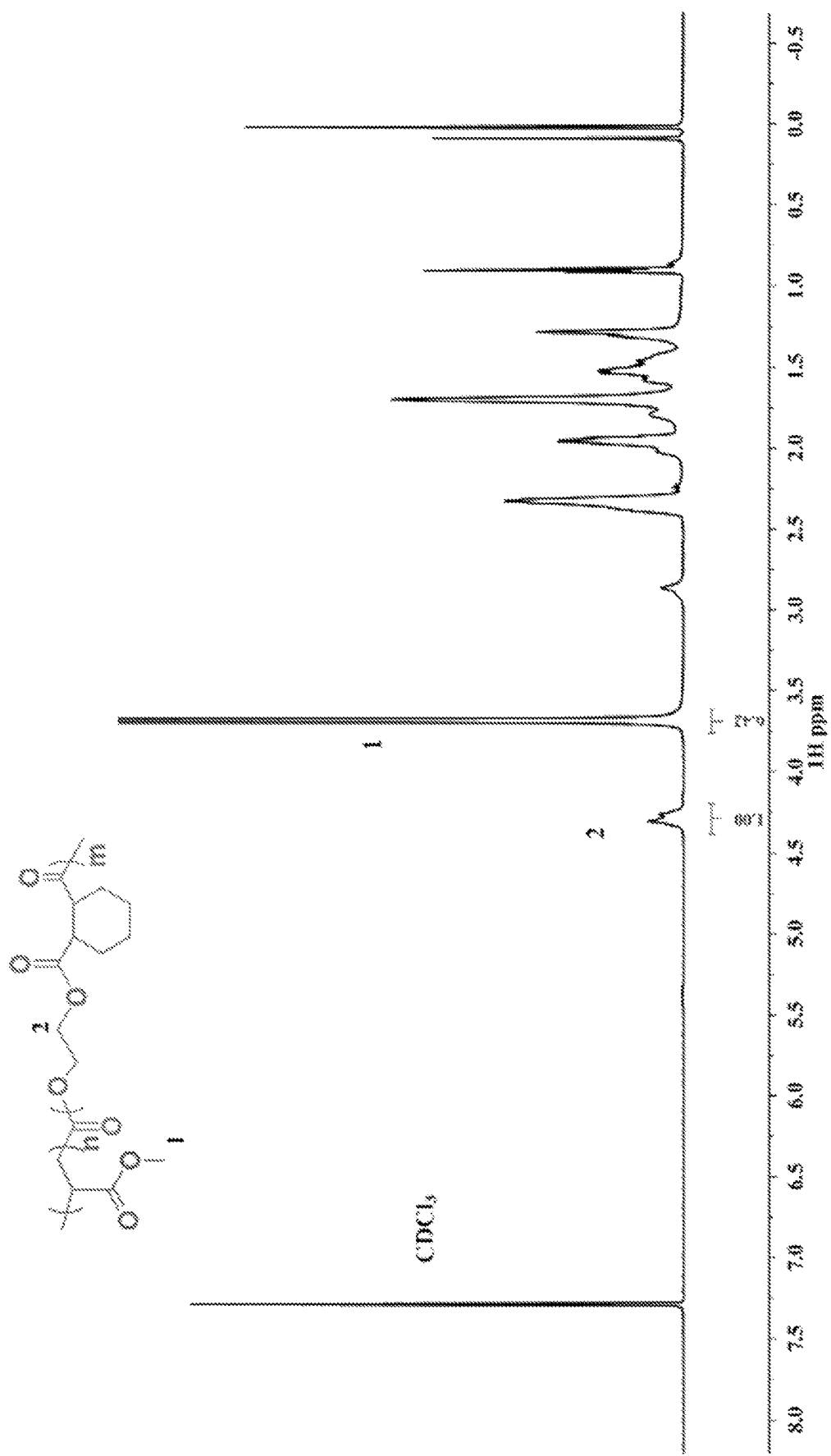
FIG. 3 is a hydrogen nuclear magnetic resonance spectrogram (1H NMR, CDCl$_3$) of an aliphatic polyester block copolymer in the Embodiment 3.

The hydrogen nuclear magnetic resonance spectrogram (1H NMR, CDCl$_3$) of the prepared aliphatic polyester block copolymer is shown in FIG. 3. It can be clearly seen from the diagram that each functional group in the block copolymer corresponds to the hydrogen spectrogram one by one. It is shown that the aliphatic polyester block copolymer was successfully prepared by the preparation method of the Embodiment 3.

Figure 2:
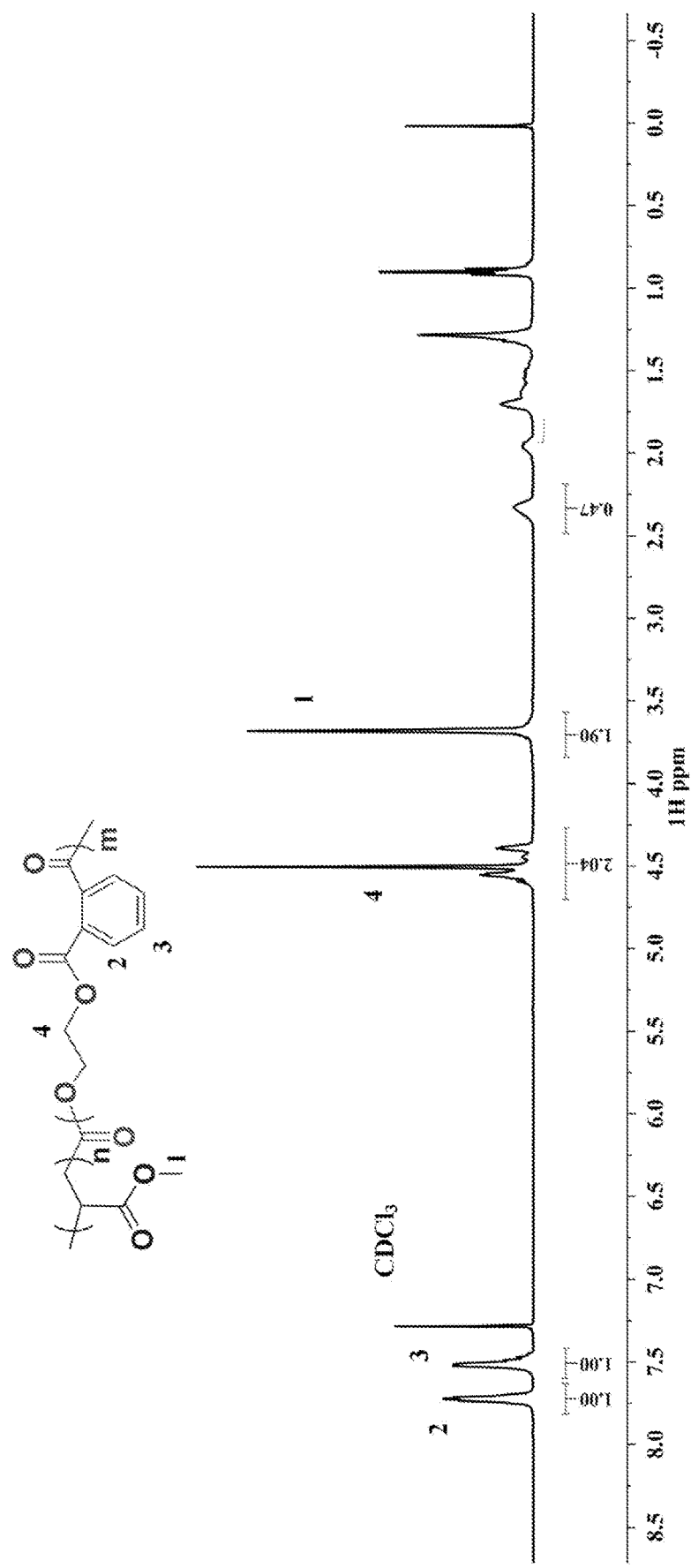
FIG. 2 is a hydrogen nuclear magnetic resonance spectrogram (1H NMR, CDCl$_3$) of an aliphatic polyester block copolymer in the Embodiment 2.

The hydrogen nuclear magnetic resonance spectrogram (1H NMR, CDCl$_3$) of the prepared aliphatic polyester block copolymer is shown in FIG. 2. It can be clearly seen from the diagram that each functional group in the block copolymer corresponds to the hydrogen spectrogram one by one. It is shown that the aliphatic polyester block copolymer was successfully prepared by the preparation method of the Embodiment 2.

Embodiment 3

S1: 9.5 mL of ethylene oxide, 4.5 mL of methyl acrylate, 1.54 g of 1,2-cyclohexanedioic anhydride and 64 mg of N,N-bis(3,5-di-tert-butylsalicylidene-1,2-cyclohexanediamine) cobalt chloride complex (epoxy compound:aliphatic acid anhydride:vinyl monomer:catalyst=500:100:100:1) were taken from an anhydrous and oxygen-isolated glove box and added to the reaction eggplant flask. After magnetic stirring was performed for 10 minutes, a pre-reaction mixed solution was obtained.

S2: The system was kept sealed, and the temperature of the reaction eggplant flask was controlled at 30° C., that is, the anionic ring-opening copolymerization reaction of the epoxy compound and the aliphatic acid anhydride was initiated.

S3: Reaction was carried out for 38 hours. The anionic ring-opening copolymerization system was filled with 2.0 MPa of carbon monoxide, and the temperature of the reaction eggplant flask was controlled at 30° C. The insertion reaction of the carbon monoxide was initiated, and the active catalytic site of the active free-radical polymerization was formed.

S4: The reaction was carried out for 12 hours. The carbon monoxide in the reaction vessel was released, and the reaction temperature was controlled at 20° C. The active free-radical polymerization of the vinyl monomer was initiated under the irradiation of a white light with a light intensity of 5 mW/cm$^{-2}$.

S5: The reaction was carried out for 1 hour. The irradiation of light was turned off to complete the active free-radical polymerization, the catalyst and unreacted raw materials were removed, and an aliphatic polyester block copolymer with a molecular weight distribution index of 1.06 was obtained.

The hydrogen nuclear magnetic resonance spectrogram (1H NMR, CDCl$_3$) of the prepared aliphatic polyester block copolymer is shown in FIG. 3. It can be clearly seen from the diagram that each functional group in the block copolymer corresponds to the hydrogen spectrogram one by one. It is shown that the aliphatic polyester block copolymer was successfully prepared by the preparation method of the Embodiment 3.

Embodiment 4

S1: 19 mL of ethylene oxide, 11.25 mL of methyl acrylate, 1.215 g of 1,2,3,6-tetrahydrophthalic anhydride and 32 mg of N,N-bis(3,5-di-tert-butylsalicylidene-1,2-cyclohexylamine) cobalt chloride complex (epoxy compound:aliphatic acid anhydride:vinyl monomer:catalyst=10000:500:800:1) were taken from an anhydrous and oxygen-isolated glove box and added to the reaction eggplant flask. After magnetic stirring was performed for 30 minutes, a pre-reaction mixed solution was obtained.

S2: The system was kept sealed, and the temperature of the reaction eggplant flask was controlled at 30° C., that is, the anionic ring-opening copolymerization reaction of the epoxy compound and the aliphatic acid anhydride was initiated.

S3: Reaction was carried out for 40 hours. The anionic ring-opening copolymerization system was filled with 2.0 MPa of carbon monoxide, and the temperature of the reaction eggplant flask was controlled at 30° C. The insertion reaction of the carbon monoxide was initiated, and the active catalytic site of the active free-radical polymerization was formed.

S4: The reaction was carried out for 11 hours. The carbon monoxide in the reaction vessel was released, and the reaction temperature was controlled at 20° C. The active free-radical polymerization of the vinyl monomer was initiated under the irradiation of a white light with a light intensity of 5 mW/cm$^{-2}$.

S5: The reaction was carried out for 1 hour. The irradiation of light was turned off to complete the active free-radical polymerization, the catalyst and unreacted raw materials were removed, and an aliphatic polyester block copolymer with a molecular weight distribution index of 1.10 was obtained.

Figure 4:
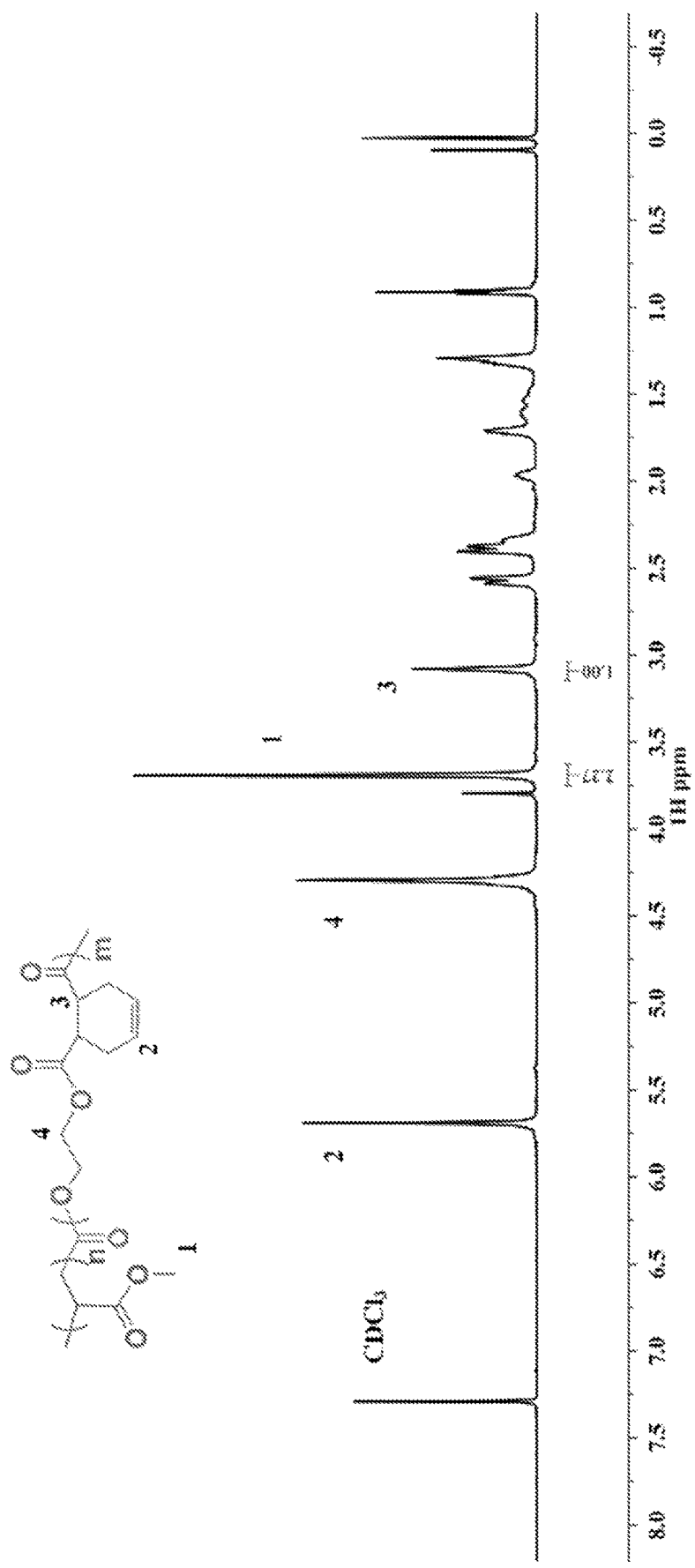
FIG. 4 is a hydrogen nuclear magnetic resonance spectrogram (1H NMR, CDCl$_3$) of an aliphatic polyester block copolymer in the Embodiment 4.
Figure 5:
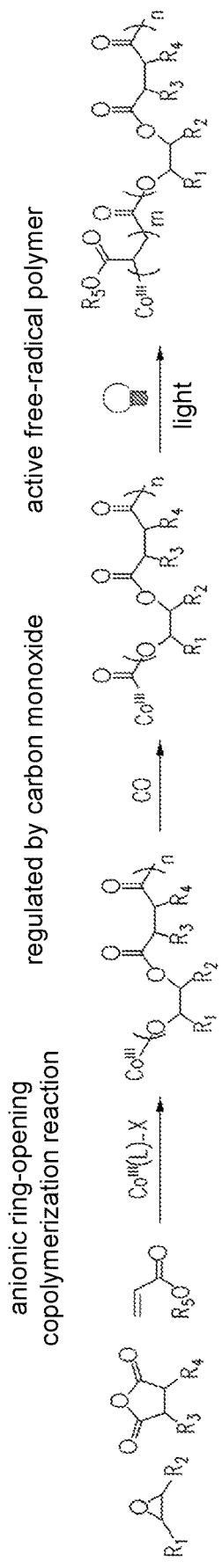
FIG. 5 is a synthesis method of a target block copolymer.

The hydrogen nuclear magnetic resonance spectrogram (1H NMR, CDCl$_3$) of the prepared aliphatic polyester block copolymer is shown in FIG. 4. It can be clearly seen from the diagram that each functional group in the block copolymer corresponds to the hydrogen spectrogram one by one. It is shown that the aliphatic polyester block copolymer was successfully prepared by the preparation method of the Embodiment 4.

Embodiment 5

The difference between the Embodiment 5 and the Embodiment 3 is:

S4: The reaction was carried out for 12 hours. The carbon monoxide in the reaction vessel was released, and the reaction temperature was controlled at 20° C. The active free-radical polymerization of the vinyl monomer was initiated under the irradiation of a white light with a light intensity of 1 mW/cm$^{-2}$.

S5: The reaction was carried out for 4 hours. The irradiation of light was turned off to complete the active free-radical polymerization, the catalyst and unreacted raw materials were removed, and an aliphatic polyester block copolymer with a molecular weight distribution index of 1.17 was obtained. The rest of the steps are the same as in the Embodiment 3.

Embodiment 6

S1: 9.5 mL of ethylene oxide, 4.5 mL of methyl acrylate, 1.54 g of 1,2-cyclohexanedioic anhydride and 64 mg of N,N-bis(3,5-di-tert-butylsalicylidene-1,2-cyclohexanediamine) cobalt chloride complex (epoxy compound:aliphatic acid anhydride:vinyl monomer:catalyst=500:100:100:1) were taken from an anhydrous and oxygen-isolated glove box and added to the reaction eggplant flask. After magnetic stirring was performed for 15 minutes, a pre-reaction mixed solution was obtained.

S2: The system was kept sealed, and the temperature of the reaction eggplant flask was controlled at 0° C., that is, the anionic ring-opening copolymerization reaction of the epoxy compound and the aliphatic acid anhydride was initiated.

S3: Reaction was carried out for 50 hours. The anionic ring-opening copolymerization system was filled with 0.1 MPa of carbon monoxide, and the temperature of the reaction eggplant flask was controlled at 0° C. The insertion reaction of the carbon monoxide was initiated, and the active catalytic site of the active free-radical polymerization was formed.

S4: The reaction was carried out for 12 hours. The carbon monoxide in the reaction vessel was released, and the reaction temperature was controlled at 0° C. The active free-radical polymerization of the vinyl monomer was initiated under the irradiation of a white light with a light intensity of 5 mW/cm$^{-2}$.

S5: The reaction was carried out for 4 hours. 320 mg of 1,1-diphenyl-2-trinitrophenylhydrazine as the polymerization inhibitor was added. The active free-radical polymerization was terminated, the catalyst and unreacted raw materials were removed, and an aliphatic polyester block copolymer with a molecular weight distribution index of 1.17 was obtained.

Embodiment 7

S1: 9.5 mL of ethylene oxide, 4.5 mL of methyl acrylate, 1.54 g of 1,2-cyclohexanedioic anhydride and 64 mg of N,N-bis(3,5-di-tert-butylsalicylidene-1,2-cyclohexanediamine) cobalt chloride complex (epoxy compound:aliphatic acid anhydride:vinyl monomer:catalyst=500:100:100:1) were taken from an anhydrous and oxygen-isolated glove box and added to the reaction eggplant flask. After magnetic stirring was performed for 5 minutes, a pre-reaction mixed solution was obtained.

S2: The system was kept sealed, and the temperature of the reaction eggplant flask was controlled at 60° C., that is, the anionic ring-opening copolymerization reaction of the epoxy compound and the aliphatic acid anhydride was initiated.

S3: Reaction was carried out for 12 hours. The anionic ring-opening copolymerization system was filled with 5.0 MPa of carbon monoxide, and the temperature of the reaction eggplant flask was controlled at 60° C. The insertion reaction of the carbon monoxide was initiated, and the active catalytic site of the active free-radical polymerization was formed.

S4: The reaction was carried out for 4 hours. The carbon monoxide in the reaction vessel was released, and the reaction temperature was controlled at 60° C. The active free-radical polymerization of the vinyl monomer was initiated under the irradiation of a white light with a light intensity of 5 mW/cm$^{-2}$.

S5: The reaction was carried out for 0.5 hour. 640 mg of benzoquinone as the polymerization inhibitor was added. The active free-radical polymerization was terminated, the catalyst and unreacted raw materials were removed, and an aliphatic polyester block copolymer with a molecular weight distribution index of 1.19 was obtained.

Comparative Example 1

The difference between Comparative Example 1 and the Embodiment 3 is:

S1: 57 mL of ethylene oxide, 6.75 mL of methyl acrylate, 11.85 g of 1,2-cyclohexanedioic anhydride and 6.4 mg of N,N-bis(3,5-di-tert-butylsalicylidene-1,2-cyclohexanediamine) cobalt chloride complex (epoxy compound:aliphatic acid anhydride:vinyl monomer:catalyst=30000:1500:1500:1) were taken from an anhydrous and oxygen-isolated glove box and added to the reaction eggplant flask. After magnetic stirring was performed for 10 minutes, a pre-reaction mixed solution was obtained.

S3: Reaction was carried out for 60 hours. The anionic ring-opening copolymerization system was filled with 2.0 MPa of carbon monoxide, and the temperature of the reaction eggplant flask was controlled at 30° C. The insertion reaction of the carbon monoxide was initiated, and the active catalytic site of the active free-radical polymerization was formed.

S5: The reaction was carried out for 1 hour. The irradiation of light was turned off to complete the active free-radical polymerization, the catalyst and unreacted raw materials were removed, and an aliphatic polyester block copolymer with a molecular weight distribution index of 1.12 was obtained. The rest of the steps are the same as in the Embodiment 3.

Due to the low content of catalyst in the reaction system, although the molecular weight distribution of the prepared aliphatic polyester block copolymer is narrow, the reaction time of the system is very long.

Comparative Example 2

The difference between Comparative Example 2 and the Embodiment 3 is:

S1: 3.8 mL of ethylene oxide, 1.8 mL of methyl acrylate, 3.16 g of 1,2-cycloadipic anhydride and 6.4 mg of N,N-bis(3,5-di-tert-butylsalicylidene-1,2-cyclohexanediamine)

cobalt chloride complex (epoxy compound:aliphatic acid anhydride:vinyl monomer:catalyst=200:40:40:1) were taken from an anhydrous and oxygen-isolated glove box and added to the reaction eggplant flask. After magnetic stirring was performed for 10 minutes, a pre-reaction mixed solution was obtained.

S3: Reaction was carried out for 36 hours. The anionic ring-opening copolymerization system was filled with 2.0 MPa of carbon monoxide, and the temperature of the reaction eggplant flask was controlled at 30° C. The insertion reaction of the carbon monoxide was initiated, and the active catalytic site of the active free-radical polymerization was formed.

S5: The reaction was carried out for 1 hour. The irradiation of light was turned off to complete the active free-radical polymerization, the catalyst and unreacted raw materials were removed, and an aliphatic polyester block copolymer with a molecular weight distribution index of 1.43 was obtained. The rest of the steps are the same as in the Embodiment 3.

Due to the poor solubility of solid compounds in the reaction system, the prepared aliphatic polyester block copolymer has a wider molecular weight distribution.

Comparative Example 3

The difference between Comparative example 3 and the Embodiment 3 is that, S3: the reaction was carried out for 48 hours, the temperature of the reaction eggplant flask was controlled at 30° C., and the reaction was performed. The remaining steps are the same as those in the Embodiment 1. The block copolymer, which is phthalic acid-propylene oxide, with a molecular weight distribution index of 1.45 was obtained.

In the absence of carbon monoxide as the conversion agent, the active catalytic site for active free-radical polymerization cannot be generated in step S3, and even under the condition of light irradiation, the vinyl group cannot undergo active free-radical polymerization.

Comparative Example 4

The difference between Comparative example 4 and the Embodiment 3 is:

S4: The reaction was carried out for 12 hours. The carbon monoxide in the reaction vessel was released, and the reaction temperature was controlled at 20° C. The active free-radical polymerization of the vinyl monomer was initiated under the irradiation of a white light with a light intensity of 0.5 mW/cm$^{-2}$.

S5: The reaction was carried out for 8 hours. The irradiation of light was turned off to complete the active free-radical polymerization, the catalyst and unreacted raw materials were removed, and an aliphatic polyester block copolymer with a molecular weight distribution index of 1.15 was obtained. The rest of the steps are the same as in the Embodiment 3. Although the prepared aliphatic polyester block copolymer has a narrow molecular weight distribution index, due to the low intensity of white light, it still takes a long time to prepare the block copolymer, and the preparation time is too long, which affects the preparation efficiency.

Comparative Example 5

The difference between Comparative example 5 and the Embodiment 3 is:

S4: The reaction was carried out for 12 hours. The carbon monoxide in the reaction vessel was released, and the reaction temperature was controlled at 20° C. The active free-radical polymerization of the vinyl monomer was initiated under the irradiation of a white light with a light intensity of 15 mW/cm$^{-2}$.

S5: The reaction was carried out for 0.2 hour. The irradiation of light was turned off to complete the active free-radical polymerization, the catalyst and unreacted raw materials were removed, and an aliphatic polyester block copolymer with a molecular weight distribution index of 1.34 was obtained. The rest of the steps are the same as in the Embodiment 3.

When the intensity of the white light is excessively high, the active free-radical polymerization speed is too fast, so the molecular weight distribution index of the aliphatic polyester block copolymer is wider.

Comparative Example 6

The difference between Comparative example 6 and the Embodiment 3 is:

S2: The system was kept sealed, and the temperature of the reaction eggplant flask was controlled at −10° C., that is, the anionic ring-opening copolymerization reaction of the epoxy compound and the aliphatic acid anhydride was initiated.

S3: Reaction was carried out for 68 hours. The anionic ring-opening copolymerization system was filled with 2.0 MPa of carbon monoxide, and the temperature of the reaction eggplant flask was controlled at −20° C. The insertion reaction of the carbon monoxide was initiated, and the active catalytic site of the active free-radical polymerization was formed.

S4: The reaction was carried out for 12 hours. The carbon monoxide in the reaction vessel was released, and the reaction temperature was controlled at −10° C. The active free-radical polymerization of the vinyl monomer was initiated under the irradiation of a white light with a light intensity of 5 mW/cm$^{-2}$. The remaining steps are identical with the steps in the Embodiment 3.

The catalyst and unreacted raw materials were removed, and an aliphatic polyester block copolymer with a molecular weight distribution index of 1.11 was obtained.

Because the temperature in the reaction system is too low, the catalyst activity is greatly reduced, and although the molecular weight distribution of the prepared aliphatic polyester block copolymer is narrow, the reaction time of the system is very long.

Comparative Example 7

The difference between Comparative example 7 and the Embodiment 3 is:

The reaction temperature of S2, S3 and S4 was kept at 80° C. for the reaction, and the remaining steps were the same as those in the Embodiment 3, and no polymer was found to be obtained after 1HNMR detection.

Since the catalyst has a certain tolerance, when the temperature is excessively high, the activity of the catalyst will be deactivated, and the aliphatic polyester block copolymer cannot be synthesized.

Although embodiments of the present disclosure have been shown and described as above, it will be understood by those skilled in the art that various changes, modifications, substitutions and deformation can be made to these embodiments without departing from the principle and spirit of the disclosure. The scope of the present disclosure is defined by the appended claims and their equivalents.

What is claimed is:

1. A method for synthesizing an aliphatic polyester block copolymer regulated by a carbon monoxide, using an organic cobalt metal complex as a convertible catalyst, using an aliphatic acid anhydride, an epoxy compound monomer and a vinyl monomer as reaction raw materials, and using the carbon monoxide as a conversion agent, wherein a "one-pot method" is adopted to synthesize the aliphatic polyester block copolymer, and the method comprises the following steps:

the organic cobalt metal complex regulates the epoxy compound monomer and the aliphatic acid anhydride to carry out an anionic ring-opening copolymerization reaction, and then the carbon monoxide is filled in to obtain a new catalytic active site, thereafter the vinyl monomer is regulated under an illumination condition to carry out an active free-radical polymerization, and finally separation, purification and drying are performed to obtain the aliphatic polyester block copolymer.

2. The method for synthesizing the aliphatic polyester block copolymer regulated by the carbon monoxide according to claim 1, comprising the following steps:

S1: under an atmosphere of a protective gas, the epoxy compound monomer, the aliphatic acid anhydride, the vinyl monomer, and the organic cobalt metal complex catalyst are uniformly mixed in a reaction vessel to form a pre-reaction mixed solution, wherein a molar ratio of the epoxy compound:the aliphatic acid anhydride: the vinyl monomer:and the catalyst is (250-20000):(50-1000):(50-1000): 1;

S2: the reaction vessel described in step S1 is sealed and placed under a predetermined reaction temperature; the anionic ring-opening copolymerization reaction between the epoxy compound monomer and the aliphatic acid anhydride described in step S1 is performed;

S3: after the reaction in step S2 is carried out for a certain period of time, the protective gas in the reaction vessel described in step S2 is replaced with the carbon monoxide at a predetermined pressure, and the reaction vessel is placed under a predetermined reaction temperature, that is, a carbon monoxide insertion reaction is performed to form the new catalytic active site through the free radical polymerization;

S4: after the reaction in step S3 is carried out for a certain period of time, the carbon monoxide in the reaction vessel of step S3 is replaced with the protective gas, and the reaction vessel is placed under a predetermined reaction temperature, under the irradiation of a white light, the active free-radical polymerization of the vinyl monomer is initiated;

S5: after the reaction in step S4 is carried out for a certain period of time, the white light is turned off or a polymerization inhibitor is added to terminate the active free-radical polymerization in step S4, the catalyst and unreacted monomers are removed from a prepared crude product, then purification and drying are performed to obtain a target block copolymer.

3. The method for synthesizing the aliphatic polyester block copolymer regulated by the carbon monoxide according to claim 2, wherein a molar ratio of the epoxy compound: the aliphatic acid anhydride: the vinyl monomer: the catalyst is (500-10000):(100-500):(100-800):1.

4. The method for synthesizing the aliphatic polyester block copolymer regulated by the carbon monoxide according to claim 2, wherein a mixing time of the pre-reaction mixed solution described in step S1 is 5 to 30 minutes; and the protective gas in step S1 is nitrogen or an inert gas.

5. The method for synthesizing the aliphatic polyester block copolymer regulated by the carbon monoxide according to claim 2, wherein the predetermined reaction temperature in step S2 is 0 to 60° C.

6. The method for synthesizing the aliphatic polyester block copolymer regulated by the carbon monoxide according to claim 2, wherein the predetermined pressure in step S3 is 0.1 to 5.0 MPa; and the predetermined reaction temperature in step S3 is 0 to 60° C.

7. The method for synthesizing the aliphatic polyester block copolymer regulated by the carbon monoxide according to claim 2, wherein the predetermined reaction temperature in step S4 is 0 to 60° C.; a light intensity of the white light in step S4 is 1 to 10 mW/cm$^{-2}$; and a wavelength range of the white light is 390 to 780 nm.

8. The method for synthesizing the aliphatic polyester block copolymer regulated by the carbon monoxide according to claim 2, wherein the polymerization inhibitor in step S5 is at least one of benzoquinone, nitro compound, aromatic amine, phenol, 1,1-diphenyl-2-trinitrophenylhydrazine, and triphenylmethyl.

9. The method for synthesizing the aliphatic polyester block copolymer regulated by the carbon monoxide according to claim 2, wherein the organic cobalt metal complex is a cobalt-based double-Schiff base complex, and the cobalt-based double-Schiff base complex has one of III-V structural formulas:

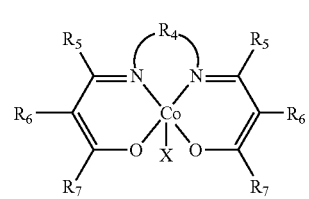

III

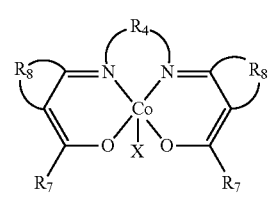

IV

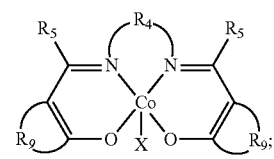

V wherein in the structural formula III-V, a group $R_4$ is an alkyl chain containing a substituted group A2, and the alkyl chain is one of a C1-C20 alkyl group or a C1-C20 alkoxy group, and the substituent group A2 is halogen, nitro, amino or cyano;

in the structural formula III-V, groups $R_5$, $R_6$ and $R_7$ are respectively selected from one of H, the C1-C20 alkyl group, the C1-C20 alkoxy group and a C1-C20 fluorine-substituted alkyl group; $R_8$ and $R_9$ are respectively one of the C1-C20 alkyl group, a C6-C20 aryl group and the C6-C20 aryl group containing a substituent group;

in the structural formula III-V, a group X is one of halogen, —$NO_3$, $CH_3COO$—, $CF_3COO$—, $ClO_4$—, $BF_4$—, $BPh_4$-, —CN, —$N_3$, p-toluic acid radical, p-toluenesulfonic acid radical, o-nitrophenol oxygen, p-nitrophenol oxygen, m-nitrophenol oxygen, 2,4-dinitrophenol oxygen, 3,5-dinitrophenol oxygen, 2,4,6-trinitrophenol oxygen, 3,5-dichlorophenolic oxygen, 3,5-difluorophenolic oxygen, 3,5-ditrifluoromethylphenolic oxygen or pentafluorophenolic oxygen anion.

10. The method for synthesizing the aliphatic polyester block copolymer regulated by the carbon monoxide according to claim 1, wherein the epoxy compound monomer has the following structure:

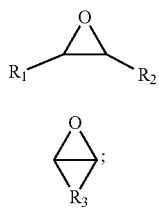

wherein in a structure I, groups $R_1$ and $R_2$ are respectively selected from one of H, a C1-C20 alkyl group containing a substituent group or a C6-C20 aryl group containing a substituent group A1; in a structure II, a group $R_3$ is selected from one of the C1-C20 alkyl group, the C6-C20 aryl group, the C1-C20 alkyl group containing the substituent group A1 and the C6-C20 aryl group containing the substituent group A1; the substituent group A1 is one of halogen, nitro or cyano;

the vinyl monomer is at least one of acrylate, acrylonitrile, N-alkylpyrrolidone, N,N-dialkylacrylamide and N-acryloylmorpholine.

11. The method for synthesizing the aliphatic polyester block copolymer regulated by the carbon monoxide according to claim 1, wherein the organic cobalt metal complex is a cobalt-based double-Schiff base complex, and the cobalt-based double-Schiff base complex has one of III-V structural formulas:

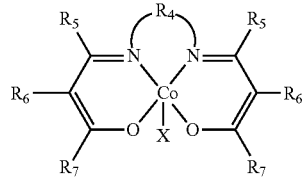
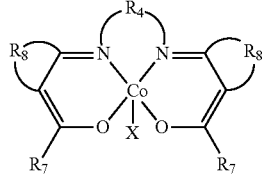
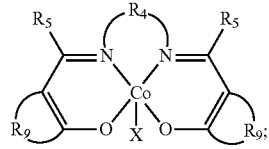

wherein in the structural formula III-V, a group $R_4$ is an alkyl chain containing a substituted group A2, and the alkyl chain is one of a C1-C20 alkyl group or a C1-C20 alkoxy group, and the substituent group A2 is halogen, nitro, amino or cyano;

in the structural formula III-V, groups $R_5$, $R_6$ and $R_7$ are respectively selected from one of H, the C1-C20 alkyl group, the C1-C20 alkoxy group and a C1-C20 fluorine-substituted alkyl group; $R_8$ and $R_9$ are respectively one of the C1-C20 alkyl group, a C6-C20 aryl group and the C6-C20 aryl group containing a substituent group;

in the structural formula III-V, a group X is one of halogen, —$NO_3$, $CH_3COO$—, $CF_3COO$—, $ClO_4$—, $BF_4$—, $BPh_4$-, —CN, —$N_3$, p-toluic acid radical, p-toluenesulfonic acid radical, o-nitrophenol oxygen, p-nitrophenol oxygen, m-nitrophenol oxygen, 2,4-dinitrophenol oxygen, 3,5-dinitrophenol oxygen, 2,4,6-trinitrophenol oxygen, 3,5-dichlorophenolic oxygen, 3,5-difluorophenolic oxygen, 3,5-ditrifluoromethylphenolic oxygen or pentafluorophenolic oxygen anion.

* * * * *